Patented July 22, 1924.

1,502,149

UNITED STATES PATENT OFFICE.

MATTHEW D. MANN, JR., OF ROSELLE, NEW JERSEY, ASSIGNOR TO SETH B. HUNT, TRUSTEE, OF MOUNT KISCO, NEW YORK.

PURIFYING AND DEODORIZING ISOPROPYL ALCOHOL.

No Drawing. Application filed September 8, 1921. Serial No. 499,234.

*To all whom it may concern:*

Be it known that I, MATTHEW D. MANN, Jr., a citizen of the United States, residing at Roselle, in the county of Union and State of New Jersey, have invented a new and useful Improvement in Purifying and Deodorizing Isopropyl Alcohol, of which the following is a specification.

Isopropyl alcohol, particularly when produced from hydrocarbon gases containing olefins, such as the gases of oil refineries in which oil cracking operations forming propylene are carried out, has a persistent pungent foreign odor. The cause of this odor is not definitely known, but it is believed to be due to minute proportions of sulfur compounds, of unknown and obscure character. The small proportions of the sulfur compounds present may be appreciated from the fact that the sulfur content of such isopropyl alcohol varies in general from .005% to .05%.

In accordance with the present invention the deodorization and purification of such isopropyl alcohol may be accomplished by the following method.

The isopropyl alcohol is subjected to the action of a relatively small proportion of active halogen, preferably bromine, chlorine, or a chlorine yielding material, such as sodium hypochlorite in alkaline solution. The proportion of halogen is relatively small; that is, its proportion to the amount of alcohol treated is in the order of 0.5 to 2.5%, although it is readily apparent that it is large relative to the sulfur-containing impurities in the alcohol. After treatment of the active halogen material or during treatment therewith a highly adsorptive charcoal or carbon may be added to the alcohol. The purified alcohol is then recovered, suitably by distillation, and prior to such distillation the alcohol may, if desired, be made alkaline.

The following examples illustrate the procedure which may be used in carrying out the present invention.

*Example No. 1.*—To 100 volume parts of alcohol 0.5 to 1 volume part of bromine is added. To this mixture a suitable quantity of adsorptive charcoal, such as gas mask charcoal, filchar, norite or the like is added, for example, 1% by weight. The alcohol is then allowed to stand for at least one hour and is then made slightly alkaline with an excess of caustic soda and distilled.

*Example No. 2.*—1000 parts of alcohol are treated with 100 to 150 parts volume of chlorine solution containing approximately .15% by weight of chlorine. The mixture is then allowed to stand for one-half hour or longer. About .5% by weight of active charcoal is then added and the mixture distilled.

*Example No. 3.*—About 1000 volume parts of alcohol are treated with 50 to 100 parts of a solution containing approximately 5% of sodium hypochlorite and 10 to 15% sodium hydroxid. The mixture is agitated and allowed to stand for one-half to one hour and the alcohol is distilled off.

In each of the above cases a substantially complete removal of the objectionable odor from the alcohol was secured. The improvement in odor is marked even before the alcohol was distilled.

I claim:

1. The method of purifying and deodorizing isopropyl alcohol derived from hydrocarbon gases containing olefins which comprises treating the alcohol with a relatively small proportion of active halogen material.

2. The method of purifying and deodorizing isopropyl alcohol derived from hydrocarbon gases containing olefins which comprises treating the alcohol with active halogen material and charcoal.

3. The method of purifying and deodorizing isopropyl alcohol derived from hydrocarbon gases containing olefins which comprises treating the alcohol with active halogen material and an alkali and distilling off the purified alcohol.

4. The method of purifying and deodorizing isopropyl alcohol derived from hydrocarbon gases containing olefins which comprises adding to the alcohol active halogen material and decolorizing carbon, permitting it to stand and distilling off the alcohol.

5. The method of purifying and deodorizing isopropyl alcohol derived from hydrocarbon gases containing olefins which comprises admixing with 1000 volume parts of the alcohol 50 to 100 parts of chlorine water containing about .15% of chlorine, allowing the mixture to stand, adding decolorizing carbon and distilling off the alcohol.

6. The method of purifying and deodorizing isopropyl alcohol derived from hydrocarbon gases containing olefins which comprises adding to the alcohol a small proportion of halogen and decolorizing carbon, allowing the mixture to stand, adding an excess of caustic soda and distilling off the alcohol.

7. The method of deodorizing isopropyl alcohol prepared from hydrocarbon material which comprises treating it with chlorine.

8. The method of deodorizing isopropyl alcohol prepared from hydrocarbon material which comprises treating it with chlorine and active decolorizing carbon.

9. The method of deodorizing isopropyl alcohol which comprises treating it with a halogen, allowing it to stand, then adding an alkali and distilling off the alcohol.

MATTHEW D. MANN, Jr.